United States Patent
Sverrisson et al.

(10) Patent No.: US 8,779,912 B2
(45) Date of Patent: Jul. 15, 2014

(54) SYSTEM AND METHOD FOR IMMOBILIZING A VEHICLE

(75) Inventors: Heimir Sverrisson, Portsmouth, NH (US); Daniel D. Principe, Merrimack, NH (US)

(73) Assignee: Cadec Global, Inc., Manchester, NH (US)

( * ) Notice: Subject to any disclaimer, the term of this patent is extended or adjusted under 35 U.S.C. 154(b) by 846 days.

(21) Appl. No.: 12/552,629

(22) Filed: Sep. 2, 2009

(65) Prior Publication Data

US 2010/0052882 A1 Mar. 4, 2010

Related U.S. Application Data

(60) Provisional application No. 61/093,603, filed on Sep. 2, 2008.

(51) Int. Cl.
*B60R 25/10* (2013.01)
*B60R 25/04* (2013.01)

(52) U.S. Cl.
CPC ............... *B60R 25/04* (2013.01); *B60R 25/10* (2013.01)
USPC ..................... 340/426.11; 340/426.3

(58) Field of Classification Search
USPC .................. 340/426.11, 426.3, 901
IPC .................. G08B 1/00; B60L 1/00; F02D 1/00
See application file for complete search history.

(56) References Cited

U.S. PATENT DOCUMENTS

| | | | |
|---|---|---|---|
| 4,359,020 A * | 11/1982 | Stotz | 123/145 A |
| 5,444,430 A | 8/1995 | McShane | |
| 5,463,372 A | 10/1995 | Mawyer, Sr. | |
| 5,519,255 A | 5/1996 | Asaro et al. | |
| 5,635,901 A | 6/1997 | Weinblatt | |
| 5,745,030 A | 4/1998 | Aaron | |
| 5,805,054 A | 9/1998 | Baxter | |
| 6,157,317 A | 12/2000 | Walker | |
| 6,392,531 B1 | 5/2002 | Gabbard | |
| 6,504,472 B2 | 1/2003 | Machala | |
| 6,549,130 B1 | 4/2003 | Joao | |
| 6,833,785 B2 | 12/2004 | Brown et al. | |
| 7,108,178 B1 | 9/2006 | Choi | |
| 7,245,204 B2 | 7/2007 | Fieldman | |
| 7,346,439 B2 | 3/2008 | Bodin | |
| 2005/0184858 A1 | 8/2005 | Griffin | |
| 2006/0066148 A1 | 3/2006 | Nguyen | |
| 2006/0226961 A1 * | 10/2006 | Bell et al. | 340/426.3 |
| 2007/0271022 A1 | 11/2007 | Morisset | |
| 2007/0288127 A1 | 12/2007 | Haq et al. | |
| 2008/0117079 A1 * | 5/2008 | Hassan | 340/901 |

* cited by examiner

*Primary Examiner* — Shirley Lu
(74) *Attorney, Agent, or Firm* — Peter A. Nieves; Sheehan Phinney Bass + Green PA

(57) ABSTRACT

In accordance with one embodiment, an onboard computer (OBC) and associated circuitry capable of spoofing or mimicking a fault condition tricks an electronic control module (ECM) of an automobile or other such vehicle into implementing an engine derate procedure resulting in vehicle immobilization that is safe and that is credibly attributable to a genuine vehicle fault condition. For example, in response to an engine shutdown command, the OBC might cause a fault-spoofing engine shutdown device in one embodiment to spoof an engine overheating condition by inserting an electrical resistance in parallel with the resistance of an engine temperature sensor, thus lowering the electrical resistance of the temperature sensor as detected by the ECM.

16 Claims, 6 Drawing Sheets

SYSTEM AND METHOD FOR IMMOBILIZING A VEHICLE

CROSS-REFERENCE TO RELATED APPLICATION

This application claims priority to copending U.S. Provisional Patent Application entitled "System And Method For Immobilizing A Vehicle," having Ser. No. 61/093,603, filed 2 Sep. 2008, which is hereby incorporated herein in its entirety by reference.

FIELD OF INVENTION

The present invention is generally related to vehicle immobilization, and particularly related to vehicle engine shutdown.

BACKGROUND OF INVENTION

When immobilizing a vehicle so as to thwart unauthorized use of the vehicle, it is desirable that vehicle immobilization be carried out in a safe fashion so as to avoid an accident or injury. If a stolen vehicle were made to come to a sudden stop, for example, not only the driver and any passengers in the vehicle but also innocent passers-by in the vicinity of the vehicle could be injured in the accident that would likely ensue. Similarly, if a vehicle were to be immobilized in a manner that resulted in sudden inability to use brakes and/or steering, for example, this could present a similar hazard. It is therefore preferred that vehicle immobilization be carried out in a fashion that will afford a driver a reasonable chance to safely maneuver the vehicle out of harm's way before the vehicle is completely immobilized.

To avoid damage to the vehicle and/or voiding of vehicle warranties, it is furthermore desirable to carry out vehicle immobilization in a manner approved by the vehicle manufacturer.

Furthermore, in the case of carnapping/carjacking or other situations where a vehicle is being commandeered by force while the authorized driver is still present or nearby, it is desirable that immobilization of the vehicle be carried out in delayed fashion to afford a reasonable chance that the authorized driver can get away or otherwise not be present at the time of vehicle immobilization so as to avoid acts of retribution or attempts at coercion as the unauthorized driver seeks to regain control of the vehicle.

Moreover, in such situations where a vehicle is being commandeered by force while the authorized driver is still present or nearby, it is desirable that vehicle immobilization be carried out in a manner credibly attributable to a genuine vehicle fault condition. Doing so allows the authorized driver to plausibly deny that the authorized driver initiated vehicle immobilization or that the authorized driver has the ability to return the vehicle to normal control.

Although various strategies have been proposed for vehicle immobilization, there remains a heretofore unaddressed need in the industry to address the aforementioned deficiencies and inadequacies.

SUMMARY

Embodiments of the present invention provide a device, system, and method for immobilizing a vehicle.

One embodiment is a fault-spoofing engine shutdown device. Upon receiving an engine shutdown command, the engine shutdown device may alter a characteristic detected by a sensor monitored by an electronic control module of a vehicle. This may mimic a fault condition that will cause the electronic control module to carry out an engine derate procedure.

Another embodiment is a system for immobilizing a vehicle having an electronic control module that monitors one or more characteristics at one or more sensors. The system may have a memory and a processor. The processor may be configured by the memory to perform the step of receiving an engine shutdown command. The processor may be further configured by the memory to perform the step of causing a fault-spoofing engine shutdown device to alter one of the characteristics detected by one of the sensors. This may mimic a fault condition that will cause the electronic control module to carry out an engine derate procedure. The engine derate procedure will preferably appear to an unauthorized driver of the vehicle to be credibly attributable to the mimicked fault.

The engine shutdown command may be sent and received locally (at the vehicle), or the system may be equipped with a transceiver so as to permit an alert indicating unauthorized use of the vehicle to be sent to a remote location from which the engine shutdown command is then sent.

The engine shutdown command may be triggered by activation of a panic button. Where the system includes a key fob receiver, the engine shutdown command may alternatively or in addition be triggered by activation of a key fob transmitter. Where the system includes a GPS or other such position detection system, the engine shutdown command may alternatively or in addition be triggered by entry into a prescribed geographic area and/or exit from a prescribed geographic area. Where the system has a transceiver, and an alert indicating unauthorized use of the vehicle is sent to a remote location and the engine shutdown command is then received from the remote location, the engine shutdown command may alternatively or in addition be triggered by loss of communication between the vehicle and the remote location.

The sensor may be a temperature sensor and the characteristic may be electrical resistance. The fault condition may be an engine overheating condition that is mimicked by energizing a relay so as to insert an electrical resistance in parallel with the resistance of the temperature sensor, thus lowering the electrical resistance of the temperature sensor as detected by the electronic control module.

The processor may be further configured by the memory to perform the step of constraining operation of one or more other vehicle systems in such manner as to increase the likelihood that the vehicle can be safely immobilized. For example, a throttle position sensor circuit might be disabled so as to prevent a preset engine idle speed from being exceeded. As another example, a starter circuit might be disabled so as to prevent the vehicle from being restarted. As yet another example, an ECM override circuit might be disabled.

A vehicle immobilization system in accordance with a different embodiment has vehicle immobilization trigger means for triggering a vehicle immobilization command. This vehicle immobilization system also has vehicle immobilization control means for causing vehicle immobilization to be carried out in response to the vehicle immobilization command. This vehicle immobilization system also has vehicle immobilization means for immobilizing a vehicle pursuant to control by the vehicle immobilization control means.

Yet another embodiment is an automobile equipped with such a fault-spoofing engine shutdown device.

Another embodiment is a computer-readable medium having stored thereon computer-executable instructions for configuring a processor to perform any of the foregoing steps.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
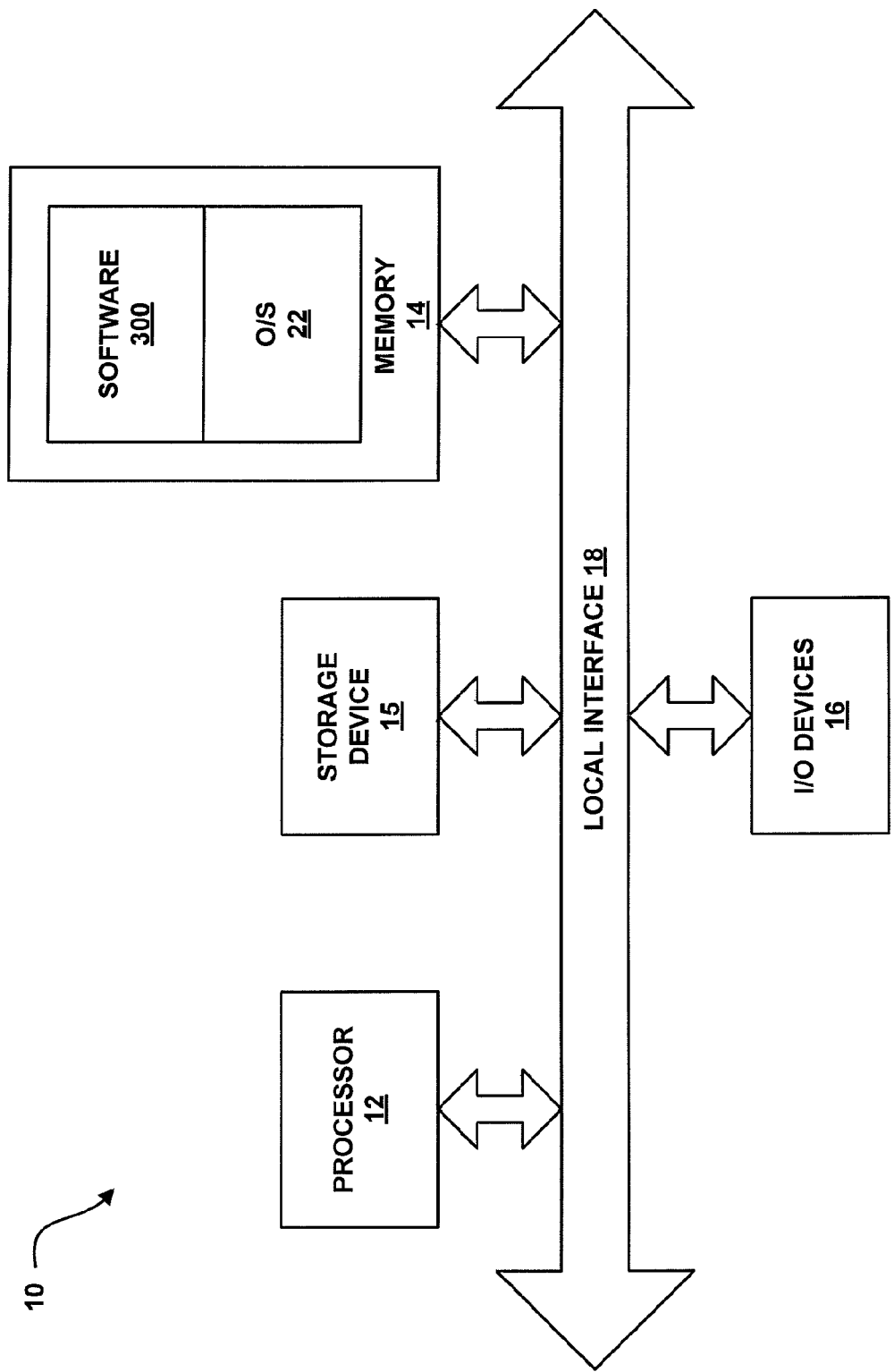
FIG. 1 is a schematic diagram showing an example of a general purpose computer and associated software for implementing a system and method for immobilizing a vehicle in accordance with the present invention.

As used herein, the phrase "vehicle immobilization" refers to any of various strategies intended to thwart unauthorized use of a vehicle and may, for example, include one or more of engine shutdown (defined below), accelerator or throttle position sensor circuit disablement, starter circuit disablement, and ECM override circuit disablement. As used herein, "vehicle immobilization" can mean complete or partial immobilization of a vehicle, partial vehicle immobilization including any impairment or reduction in functionality that would tend to constrain or limit use of the vehicle by an unauthorized driver.

As used herein, the phrase "engine shutdown" refers to a vehicle immobilization strategy in which a fault condition is spoofed or mimicked so as to cause the electronic control module (ECM) or similar logic circuitry of the vehicle to implement an engine derate procedure or other such preprogrammed routine resulting in vehicle immobilization. As used herein, "engine shutdown" can mean complete or partial shutdown of an engine, partial engine shutdown including any impairment or reduction in functionality that would tend to constrain or limit use of the vehicle by an unauthorized driver.

The present invention provides an engine shutdown device and a system and method for immobilizing a vehicle. In accordance with one embodiment, an onboard computer and associated circuitry capable of spoofing or mimicking a fault condition causes an electronic control module or similar logic circuitry to implement an engine derate procedure or other such preprogrammed routine resulting in vehicle immobilization that is safe and that is credibly attributable to a genuine vehicle fault condition. Note that where the description below refers to a system for immobilizing a vehicle in accordance with one aspect of the present invention, this description should be understood to apply as well to a device or a method in accordance with other aspects of the present invention with modification as appropriate. The present system may be provided by a Web-based application. The following description assumes that the present system is provided by a Web-based application. It should be noted that the system may also be provided in an environment that is not Web-based.

The vehicle immobilization system of the invention can be implemented in software (e.g., firmware), hardware, or a combination thereof. In the currently contemplated best mode, the vehicle immobilization system is implemented in software, as an executable program, and is executed by a special or general purpose digital computer, such as a personal computer (PC; IBM-compatible, Apple-compatible, or otherwise), workstation, minicomputer, or mainframe computer. Specifically, the vehicle immobilization system may be executed completely or partially by an onboard computer (OBC) 120 and/or an electronic control module (ECM) 110 present at a vehicle to be immobilized. Furthermore, certain aspects of execution of the vehicle immobilization system may be carried out by one or more computers present at a central dispatch office or other such location that is remote relative to the vehicle, or at one or more sites in communication therewith. Moreover, the vehicle immobilization system, as provided by the computer, may be accessible via a Web site, through which parties using the vehicle immobilization system may interact. Further description of the vehicle immobilization system, and interaction therewith, is provided below.

An example of a general purpose computer that can implement the vehicle immobilization system of the present invention is shown in FIG. 1. In FIG. 1, the vehicle immobilization system is denoted by reference numeral 10. It should be noted that communication with the vehicle immobilization system may be provided by multiple means such as, but not limited to, the Internet. Further description with regard to use of the vehicle immobilization system via use of the Internet is provided below.

Generally, in terms of hardware architecture, as shown in FIG. 1, the computer 10 includes a processor 12, memory 14, storage device 15, and one or more input and/or output (I/O) devices 16 (or peripherals) that are communicatively coupled via a local interface 18. The local interface 18 can be, for example but not limited to, one or more buses or other wired or wireless connections, as is known in the art. The local interface 18 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 12 is a hardware device for executing software, particularly that stored in the memory 14. The processor 12 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 14 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 14 may incorporate electronic, magnetic, optical, and/or other types of storage media. Note that the memory 14 can have a distributed architecture, where various components are situated remote from one another, but can be accessed by the processor 12.

The software 300 in memory 14 may include one or more separate programs, each of which comprises an ordered listing of executable instructions for implementing logical functions of the vehicle immobilization system, as described below. In the example of FIG. 1, the software 300 in the memory 14 defines the vehicle immobilization system functionality in accordance with the present invention. In addition, the memory 14 may contain an operating system (O/S) 22. The operating system 22 essentially controls the execution of computer programs and provides scheduling, input-output control, file and data management, memory management, and communication control and related services.

Instructions for implementing the vehicle immobilization system 10 may be provided by a source program, executable program (object code), script, or any other entity comprising a set of instructions to be performed. When a source program, then the program needs to be translated via a compiler, assembler, interpreter, or the like, which may or may not be included within the memory 14, so as to operate properly in connection with the O/S 22. Furthermore, instructions for implementing the vehicle immobilization system 10 can be written as (a) an object oriented programming language, which has classes of data and methods, or (b) a procedure programming language, which has routines, subroutines, and/or functions.

The I/O devices 16 may include input devices, for example but not limited to, a keyboard, mouse, scanner, microphone, etc. Furthermore, the I/O devices 16 may also include output devices, for example but not limited to, a printer, display, etc. Finally, the I/O devices 16 may further include devices that communicate via both inputs and outputs, for instance but not limited to, a modulator/demodulator (modem; for accessing another device, system, or network), a radio frequency (RF) or other transceiver, a telephonic interface, a bridge, a router, etc.

When the vehicle immobilization system 10 is in operation, the processor 12 is configured to execute the software 300 stored within the memory 14, to communicate data to and from the memory 14, and to generally control operations of the computer 10 pursuant to the software 300. The vehicle immobilization system 10 and the O/S 22, in whole or in part, but typically the latter, are read by the processor 12, perhaps buffered within the processor 12, and then executed.

When the vehicle immobilization system 10 is implemented in software, as is shown in FIG. 1, it should be noted that instructions for implementing the vehicle immobilization system 10 can be stored on any computer-readable medium for use by or in connection with any computer-related system or method. Such a computer-readable medium may, in some embodiments, correspond to either or both the memory 14 or the storage device 15 shown in FIG. 1. In the context of this document, a computer-readable medium is an electronic, magnetic, optical, or other physical device or means that can contain or store a computer program for use by or in connection with a computer-related system or method. Instructions for implementing the vehicle immobilization system 10 can be embodied in any computer-readable medium for use by or in connection with the processor 12 or other such instruction execution system, apparatus, or device. Although the processor 12 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor 12 or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the vehicle immobilization system 10 is implemented in hardware, the vehicle immobilization system 10 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
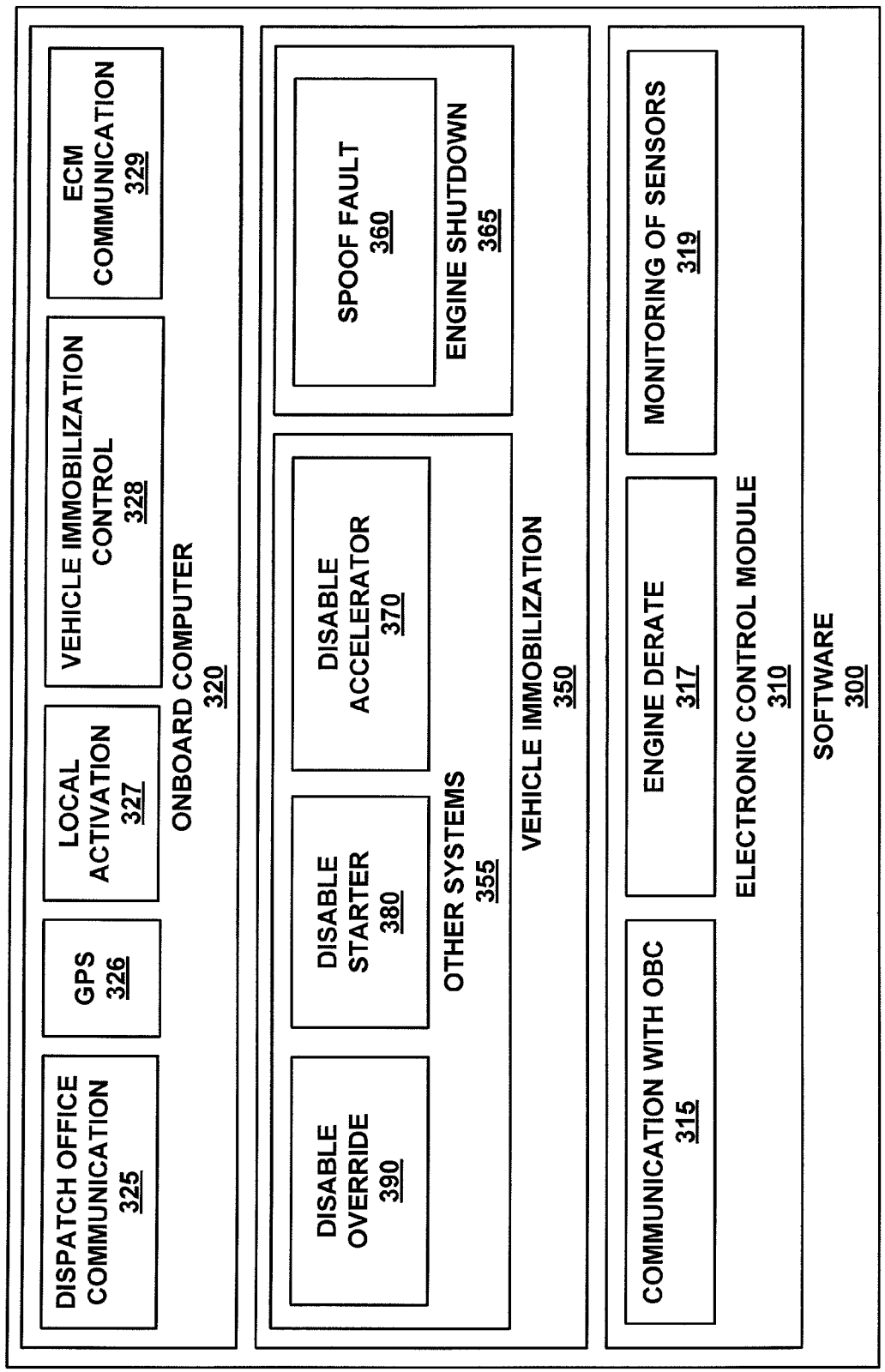
FIG. 2 is a block diagram showing functional blocks representing functionality defined by the software at FIG. 1, in accordance with a first exemplary embodiment.

Referring to FIG. 2, this is a block diagram showing functional blocks representing functionality defined by the software 300 of FIG. 1, in accordance with a first exemplary embodiment of the invention. In accordance with the present embodiment, the software 300 includes an electronic control module block 310, a vehicle immobilization block 350, and an onboard computer block 320.

The electronic control module block 310 of the present embodiment has functionality of the sort that might be present at a standard electronic control module (ECM) found in a typical automobile. For example, in the present embodiment shown in FIG. 2, the electronic control module block 310 might include a sensor monitoring block 319, an OBC communication block 315, and an engine derate block 317. The sensor monitoring block 319 might include functionality for monitoring various sensors providing data indicative of automotive performance. Examples of such sensors monitored by the sensor monitoring block 319 might include a temperature sensor 167 and a throttle position sensor circuit 177 such as those shown in FIG. 3 and described below. The OBC communication block 315 might include functionality permitting output of data monitored by the sensor monitoring block 319 to an onboard computer 120 such as that shown in FIG. 3 and described below. The engine derate block 317 might include functionality for carrying out an engine derate procedure intended to limit engine output so as to avoid damage when the sensor monitoring block 319 detects a fault or out-of-bounds condition. For example, if the sensor monitoring block 319 detects a high engine temperature condition at the temperature sensor 167 shown in FIG. 3, the engine derate block 317 might cause an engine derate procedure to be carried out so as to minimize the likelihood of engine damage. In such an engine derate procedure, the engine might be prevented from operating at more than a predetermined RPM or horsepower level, for example, until the fault or out-of-bounds condition is corrected.

The vehicle immobilization block 350 of the present embodiment has functionality for carrying out vehicle immobilization in accordance with one or more embodiments of the present invention. In the embodiment shown in FIG. 2, the vehicle immobilization block 350 includes an engine shutdown block 365 and an other systems block 355. In the embodiment shown, the engine shutdown block 365 has a spoof fault block 360 for spoofing an engine fault capable of tricking the electronic control module block 310 into implementing an engine derate procedure. Furthermore, the other systems block 355 includes a disable accelerator block 370 for disabling the vehicle accelerator, a disable starter block 380 for disabling the vehicle starter, and a disable override block 390 for disabling override functionality that might otherwise permit an engine derate procedure carried out by the engine derate block 317 or any of various other vehicle immobilization procedures to be overridden.

The onboard computer block 320 of the present embodiment has functionality of the sort that might be present at an onboard computer 120 such as that shown in FIG. 3 and described below. In the embodiment shown in FIG. 2, the onboard computer block 320 includes a dispatch office communication block 325, a GPS block 326, a local activation block 327, a vehicle immobilization control block 328, and an ECM communication block 329. The dispatch office communication block 325 has functionality for carrying out communication with a central dispatch office. The GPS block 326 has capability for determining vehicle position based on the global positioning system (GPS) or other suitable positioning system. The local activation block 327 has functionality allowing the dispatch office to be bypassed so that engine shutdown and/or other such vehicle immobilization procedures can be initiated locally by means of a panic button 140 or key fob transmitter 130, for example, as will be described in further detail below. The vehicle immobilization control block 328 has functionality for causing the vehicle immobilization block 350 to initiate engine shutdown and/or other such vehicle immobilization procedures in response to a command received from a central dispatch office by way of the dispatch office communication block 325 or in response to local activation initiated by way of the local activation block 327. The ECM communication block 329 has functionality for receiving data from the electronic control module block 310. Such data received by the ECM communication block 329 of the onboard computer block 320 may include data monitored by the sensor monitoring block 319 of the electronic control module block 310 or status information indicating progress of an engine derate procedure carried out by the engine derate block 317 of the electronic control module block 310.

Figure 3:
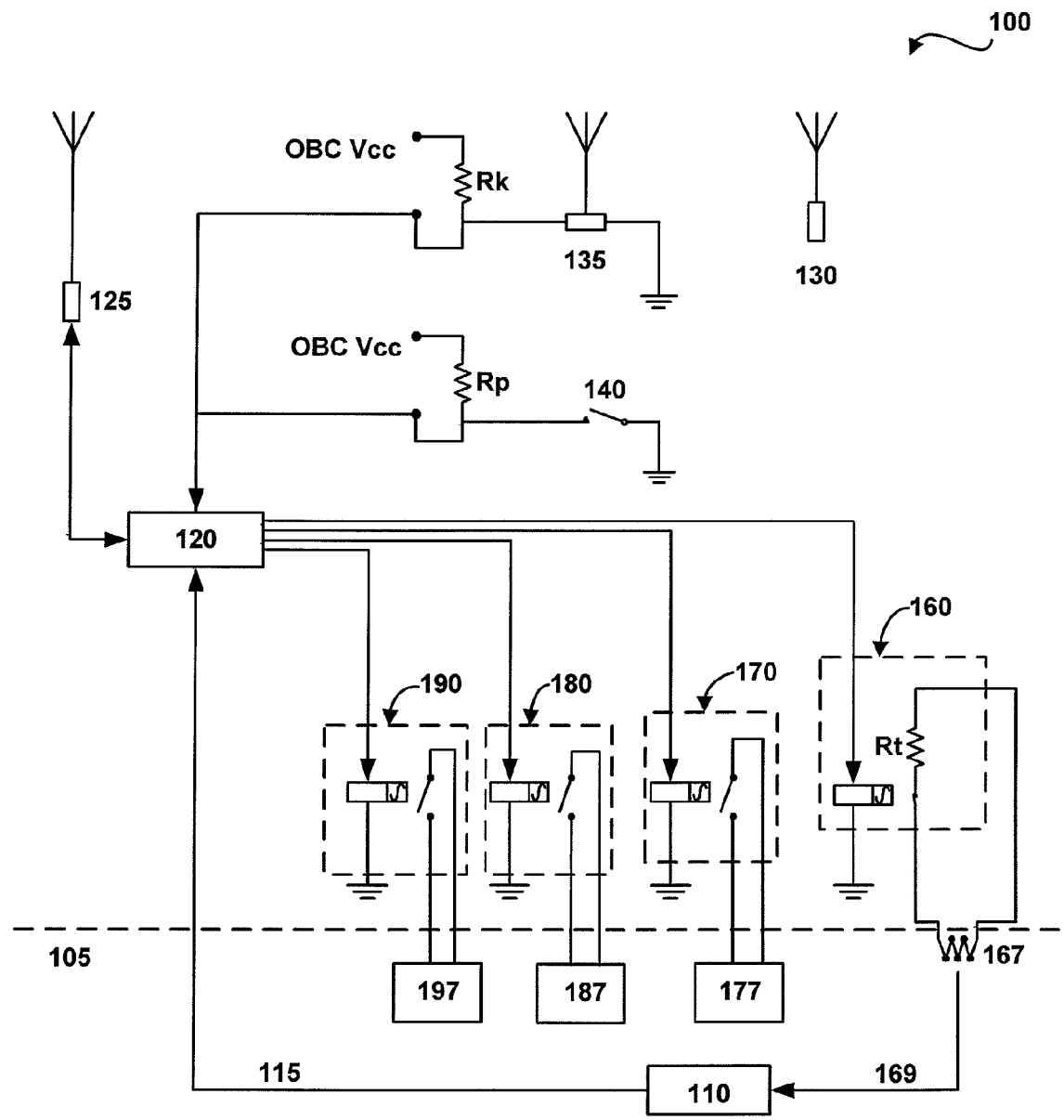
FIG. 3 is a schematic diagram showing exemplary circuitry for implementing a vehicle immobilization system in accordance with the first embodiment.

Referring to FIG. 3, this shows exemplary circuitry for implementing a vehicle immobilization system 100 in accordance with the first embodiment. The vehicle immobilization system 100 shown in FIG. 3 employs a fault-spoofing engine shutdown device 160 in accordance with a first embodiment of the present invention. In the present embodiment, the fault-spoofing engine shutdown device 160 shown in FIG. 3 serves as the spoof fault block 360 shown in FIG. 2.

Various standard components and circuitry exemplary of that which might be found in a typical vehicle, which is to say a vehicle not necessarily intended to be used with the vehicle immobilization system 100 of the present invention, are shown schematically below the dashed line 105 in FIG. 3. Various additional components and circuitry such as would be useful for implementing the vehicle immobilization system 100 of the present embodiment are shown schematically above the dashed line 105 in FIG. 3. Note that where various circuit elements are shown at FIG. 3, these are intended only to schematically show representative components and functional relationships, and should not be understood as a rigorous circuit diagram. For example, lines drawn between components in FIG. 3 need not necessarily indicate paths for flow of electric current but may indicate any of various types of connection, communication, coupling, and/or control.

Standard vehicle components and circuitry shown schematically below the dashed line 105 in FIG. 3 include, for example, an electronic control module (ECM) 110 serving as logic circuitry for controlling various functions related to engine operation, a temperature sensor 167 for sensing coolant or engine temperature, a throttle position sensor circuit 177 for sensing throttle position, a starter circuit 187 capable of activating a starter motor so as to start the engine when a starter key is turned, and an ECM override circuit 197 for forcing the ECM 110 to allow more or less normal engine operation despite occurrence of any of various fault conditions. The temperature sensor 167 may, for example, be a thermistor having negative temperature coefficient, for which electrical resistance decreases with increasing temperature. Output from the temperature sensor 167 travels by way of wiring 169 to the ECM 110. Output from the ECM 110 travels by way of wiring 115 to the onboard computer 120. In the present embodiment, the ECM 110 shown in FIG. 3 serves as the electronic control module block 310 shown in FIG. 2.

In accordance with instructions preprogrammed in the ECM 110 by the vehicle manufacturer, the ECM 110 is capable of derating the engine so as to limit engine output (including the possibility of limiting engine output to zero, which is to say completely stopping the engine) as a way of protecting the engine in response to any of various fault conditions including, for example, presence of an unsafe temperature at the temperature sensor 167.

Additional components and circuitry useful for implementing the vehicle immobilization system 100 and shown schematically above the dashed line 105 in FIG. 3 include the onboard computer 120, an onboard computer transceiver 125, a key fob transmitter 130, a key fob receiver 135, a panic button 140, the fault-spoofing engine shutdown device 160, an accelerator disable device 170, a starter disable device 180, and an ECM override disable device 190. In the present embodiment, the onboard computer 120 shown in FIG. 3 serves as the onboard computer block 320 shown in FIG. 2.

The onboard computer 120 may be in two-way communication with a dispatch office (not shown) by way of the onboard computer transceiver 125. Communication between the onboard computer 120 and the dispatch office may be by way of WiFi (WLAN), cellular modem (WWAN), or any other suitable communication method. In the present embodiment, the onboard computer transceiver 125 shown in FIG. 3 serves as the dispatch office communication block 325 shown in FIG. 2.

In addition to receiving input from the onboard computer transceiver 125, the onboard computer 120 is capable of receiving input from the key fob receiver 135 and the panic button 140 in accordance with functionality of the local activation block 327. The key fob receiver 135, which is preferably located in the vehicle, is capable of receiving a signal transmitted from the key fob transmitter 130. In the embodiment shown in FIG. 3, the key fob receiver 135 is connected by way of pull-up resistor Rk to an input that is, for example, read by software at the onboard computer 120. The panic button 140 may be a covert pushbutton that is preferably located in the vehicle and that in the embodiment shown in FIG. 3 is connected by way of a pull-up resistor Rp to an input that is, for example, read by software at the onboard computer 120.

The onboard computer 120 may be capable of monitoring various operational parameters such as engine revolutions per minute and vehicle speed by way of wiring 115 that connects the ECM 110 to the onboard computer 120. In the present embodiment, the ECM communication block 329 of the onboard computer block 320 communicates with the OBC communication block 315 of the electronic control module block 310 by way of this wiring 115.

The onboard computer 120 is connected to one or more output circuits 160, 170, 180, 190. The onboard computer 120 may, for example, use digital output to actuate relays as shown in FIG. 3 for selective control of the output circuits 160, 170, 180, 190. In the embodiment shown in FIG. 3, these output circuits are under the control of the vehicle immobilization control block 328 of the onboard computer block 320 and comprise the fault-spoofing engine shutdown device 160 serving as the spoof fault block 360, the accelerator disable device 170 serving as the disable accelerator block 370, the starter disable device 180 serving as the disable starter block 380, and the ECM override disable device 190 serving as the disable override block 390.

To frustrate any attempt by a determined unauthorized driver to defeat the fault-spoofing engine shutdown device 160, the accelerator disable device 170, the starter disable device 180, or the ECM override disable device 190 by cutting electrical power thereto, in accordance with one embodiment of the invention, the relays at the respective output circuits 160, 170, 180, 190 are, in the embodiment shown in FIG. 3, designed so as to permit normal vehicle operation by the authorized driver when in their energized states, and are designed to play their respective roles in thwarting vehicle operation by an unauthorized driver when in their deenergized states. The respective roles of the output circuits 160, 170, 180, 190 are described in further detail below.

The onboard computer 120 may also have global positioning system (GPS) capability. Where present, such global positioning system (GPS) operates under the control of the GPS block 326. Moreover, the onboard computer 120 may be able to read input analog and/or digital signals to test the status of various sensors in accordance with functionality of the ECM communication block 329.

The fault-spoofing engine shutdown device 160 is capable of spoofing or mimicking a fault condition. The fault condition spoofed by the fault-spoofing engine shutdown device 160 is preferably a condition that will cause the ECM 110 to implement an engine derate procedure or other such preprogrammed routine resulting in gradual, progressive, or stepwise engine shutdown that culminates in the engine stopping. In the embodiment shown in FIG. 3, the fault-spoofing engine shutdown device 160 comprises a normally closed relay circuit. What is meant by a normally closed relay is a relay whose contacts are closed when the relay is deenergized. When the contacts of the relay at the fault-spoofing engine shutdown device 160 are closed, an additional electrical resistance Rt is connected across the terminals of the temperature sensor 167 of the vehicle. When the relay at the fault-spoofing engine shutdown device 160 is energized during normal vehicle operation by the authorized driver, the ECM 110 sees only the resistance of the temperature sensor 167. When the relay at the fault-spoofing engine shutdown device 160 is deenergized to thwart vehicle operation by an unauthorized driver, presence of the additional electrical resistance Rt in parallel with the resistance of the temperature sensor 167 causes the ECM 110 to see an electrical resistance that is lower than the electrical resistance output by the temperature sensor 167, thereby tricking the ECM 110 into thinking that engine temperature is too high for safe operation.

The accelerator disable device 170 is capable of disabling the throttle position sensor circuit 177 of the vehicle so as to prevent the engine of the vehicle from exceeding a preset engine idle speed (revolutions per minute) regardless of whether or to what extent the vehicle operator depresses the accelerator pedal. In the embodiment shown in FIG. 3, the accelerator disable device 170 comprises a normally open relay switch that is put into series with the throttle position sensor circuit 177. What is meant by a normally open relay is a relay whose contacts are open when the relay is deenergized. When the relay at the accelerator disable device 170 is energized during normal vehicle operation by the authorized driver, the throttle position sensor circuit 177 functions normally so as to permit normal accelerator operation. When the relay at the accelerator disable device 170 is deenergized to thwart vehicle operation by an unauthorized driver, opening of the relay contacts puts an electrical open in series with the throttle position sensor circuit 177 causing throttle control to be disabled and forcing the engine of the vehicle to idle.

The starter disable device 180 is capable of disabling the starter circuit 187 of the vehicle so as to make it impossible to restart the vehicle after the engine of the vehicle has stopped. In the embodiment shown in FIG. 3, the starter disable device 180 contains a normally open relay switch that is put into series with the starter circuit 187. What is meant by a normally open relay is a relay whose contacts are open when the relay is deenergized. When the relay at the starter disable device 180 is energized during normal vehicle operation by the authorized driver, the starter circuit 187 functions normally so as to permit the vehicle to be restarted. When the relay at the starter disable device 180 is deenergized to thwart vehicle operation by an unauthorized driver, opening of the relay contacts puts an electrical open in series with the starter circuit 187, making it impossible to start the engine.

The ECM override disable device 190 is capable of disabling the ECM override circuit 197 of the vehicle. The ECM override disable device 190 contains a normally open relay switch that is put into series with the ECM override circuit 197. What is meant by a normally open relay is a relay whose contacts are open when the relay is deenergized. When the relay at the ECM override disable device 190 is energized during normal vehicle operation by the authorized driver, the ECM override circuit 197 functions normally so as to permit the ECM 110 to be reset such that any fault condition detected by the ECM 110 is forgotten or ignored. When the relay at the ECM override disable device 190 is deenergized to thwart vehicle operation by an unauthorized driver, opening of the relay contacts puts an electrical open in series with the ECM override circuit 197, making it impossible to send an override signal to the engine ECM.

Figure 4:
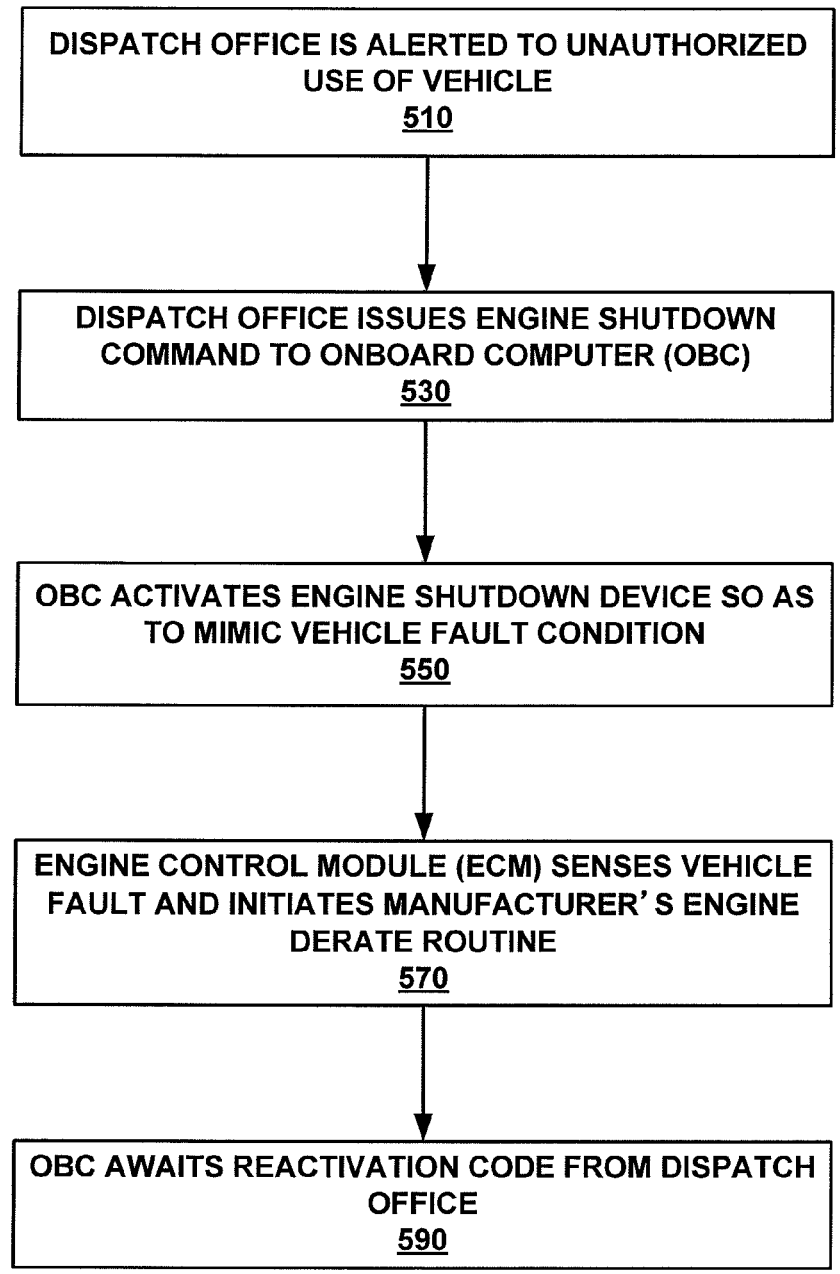
FIG. 4 is a flowchart indicating a procedure by which a vehicle may be immobilized in the context of the vehicle immobilization system shown in FIG. 3.

FIG. 4 is a flowchart indicating a procedure by which a vehicle may be immobilized in the context of the vehicle immobilization system 100 described with reference to FIG. 3.

As shown by block 510 in the flowchart of FIG. 4, occurrence of one or more events alerts a dispatch office to the possibility that there may be an attempt at unauthorized use of a vehicle.

With continued reference to FIG. 4 and additional reference to FIG. 3, in the event that the vehicle is to be immobilized, the dispatch office automatically or in response to input from an administrator or other such person having appropriate authority sends an engine shutdown command to the onboard computer 120 at the vehicle, as shown by block 530 in the flowchart of FIG. 4.

As shown by block 550, after receiving the engine shutdown command from the dispatch office, the onboard computer 120 causes the fault-spoofing engine shutdown device 160 to mimic a vehicle fault condition.

As shown by block 570, after sensing the vehicle fault condition spoofed by the engine shutdown device 160, the ECM 110 implements an engine derate procedure in accordance with instructions preprogrammed in the ECM 110 by the vehicle manufacturer in the same fashion as if a genuine fault condition had occurred.

As shown by block 590, the onboard computer 120 thereafter awaits entry of a reactivation code before allowing resumption of normal vehicle operation.

Triggering of the engine shutdown command from the dispatch office at block 530 may be as a result of any of the following (including combinations thereof): activation of a panic button 140 or a key fob transmitter 130; loss of communication with the vehicle; entry into or exit from a prescribed geographic area as determined by GPS or other position sensing system. In addition to activation of the fault-spoofing engine shutdown device 160 at block 550, the onboard computer 120 may activate one or more of the following: an accelerator disable device 170; a starter disable device 180; and an ECM override disable device 190. It should be noted that, in accordance with an alternative embodiment of the invention, the present system may be provided without fault-spoofing.

For example, triggering of the engine shutdown command and/or one or more other vehicle immobilization commands at block 530 may occur as follows when the onboard computer transceiver 125 is functioning properly and is within the range of a transceiver at the dispatch office.

(1) An authorized driver presses the panic button 140 for at least a first predefined period of time (for example, 3 seconds).

(2) The onboard computer 120 sends a distress message to the dispatch office, the distress message including, for example, the identity of the vehicle and its authorized driver, as well as the position and speed of the vehicle, if available.

(3) A person with appropriate authority at the dispatch office decides that vehicle immobilization is warranted and causes a vehicle immobilization command to be sent to the onboard computer 120 of the vehicle. Included with the vehicle immobilization command is a unique reactivation code. What is meant in saying that the reactivation code is unique is that a different reactivation code is generated for each vehicle immobilization incident.

(4) After the onboard computer 120 receives the vehicle immobilization command, the onboard computer 120 activates the accelerator disable device 170, opening the relay contacts thereof and inserting an electrical open in series with the throttle position sensor circuit 177 so that the driver is no longer able to accelerate the vehicle and the engine is unable to exceed its preset idle speed. Power is still available for steering and braking, but the driver is unable to increase the speed of the vehicle.

(5) After a second predefined period of time (for example, 60 seconds) or when the vehicle has slowed down to a predefined speed (for example, 20 mph), whichever comes first, the onboard computer 120 activates the fault-spoofing engine shutdown device 160 that, in effect, makes the ECM 110 think that engine coolant temperature is far above its normal operating range. In accordance with instructions preprogrammed into the ECM 110 by the vehicle manufacturer, the ECM 110 then initiates a preprogrammed engine shutdown sequence in an attempt to protect the engine from damage due to overheating. At this time, the onboard computer 120 also activates the ECM override disable device 190, opening the relay contacts thereof and inserting an electrical open in series with the ECM override circuit 197 so as to prevent the driver from being able to cause the ECM 110 to ignore the fault condition.

(6) After waiting an appropriate time so as to permit the ECM 110 to carry out the engine shutdown sequence, the onboard computer 120 activates the starter disable device 180, opening the relay contacts thereof and inserting an electrical open in series with the starter circuit 187 so as to prevent the driver from being able to restart the engine.

(7) The vehicle remains in its immobilized state and is not returned to normal operability until a reactivation code sent from the dispatch office has been entered into the onboard computer 120.

As another example, triggering of the engine shutdown command and/or one or more other vehicle immobilization commands may occur as follows when the onboard computer transceiver 125 is not in communication with the dispatch office, either because the onboard computer transceiver 125 is not functioning properly or is not within the range of a transceiver at the dispatch office.

(1) An authorized driver presses the panic button 140 for at least a first predefined period of time (for example, 3 seconds).

(2) After a second predefined period of time (for example, 60 seconds) elapses during which there is no communication with the dispatch office, the onboard computer 120 activates the accelerator disable device 170, opening the relay contacts thereof and inserting an electrical open in series with the throttle position sensor circuit 177 so that the driver is no longer able to accelerate the vehicle and the engine is unable to exceed its preset idle speed. Power is still available for steering and braking, but the driver is unable to increase the speed of the vehicle.

(3) After a third predefined period of time (for example, 60 seconds) or when the vehicle has slowed down to a predefined speed (for example, 20 mph), whichever comes first, the onboard computer 120 activates the fault-spoofing engine shutdown device 160 that, in effect, makes the ECM 110 think that engine coolant temperature is far above its normal operating range. In accordance with instructions preprogrammed into the ECM 110 by the vehicle manufacturer, the ECM 110 then initiates a preprogrammed engine shutdown sequence in an attempt to protect the engine from damage due to overheating. At this time, the onboard computer 120 also activates the ECM override disable device 190, opening the relay contacts thereof and inserting an electrical open in series with the ECM override circuit 197 so as to prevent the driver from being able to cause the ECM 110 to ignore the fault condition.

(4) After waiting an appropriate time so as to permit the ECM 110 to carry out the engine shutdown sequence, the onboard computer 120 activates the starter disable device 180, opening the relay contacts thereof and inserting an electrical open in series with the starter circuit 187 so as to prevent the driver from being able to restart the engine.

(5) The vehicle remains in its immobilized state and is not returned to normal operability until a reactivation code sent from the dispatch office has been entered into the onboard computer 120. This reactivation code may, for example, be generated partly from the serial number of the onboard computer 120.

As yet another example, triggering of the engine shutdown command and/or one or more other vehicle immobilization commands may occur as follows when an authorized driver, inside the vehicle or in the vicinity of the vehicle, is in possession of a key fob transmitter 130.

(1) The authorized driver presses the key fob transmitter 130 for at least a first predefined period of time (for example, 5 seconds).

(2) In the event that the vehicle engine is not running when the signal from the key fob transmitter 130 is received by the key fob receiver 135, the onboard computer 120 activates the starter disable device 180, effectively preventing the engine from being restarted. In the event that the engine is running when the signal from the key fob transmitter 130 is received by the key fob receiver 135, the shutdown sequence described above is activated. In either event (that is, whether the vehicle engine is running or is not running), the onboard computer 120 attempts to send a distress message to the dispatch office, the distress message including, for example, the identity of the vehicle and its authorized driver, as well as the position and speed of the vehicle, if available.

(3) The vehicle remains in its immobilized state and is not returned to normal operability until a reactivation code sent from the dispatch office has been entered into the onboard computer 120.

Other examples of scenarios in which the engine shutdown command and/or one or more other vehicle immobilization commands might be triggered include situations in which a vehicle breaks a geofence, either by entering a predefined restricted area or leaving such an area, and situations in which a vehicle deviates from its predefined route. Vehicle immobilization system behavior in such scenarios could be similar to vehicle immobilization system behavior occurring at a time when the panic button 140 is pressed as described above, with a distress message being sent to the dispatch office if in communications range, or a local shutdown optionally being carried out if not in communications range. What is meant by local shutdown is vehicle immobilization occurring locally at the vehicle without the need for communication with a dispatch office or other location that is remote relative to the vehicle.

Figure 5:
FIG. 5 is an example of a Web application interface for managing immobilization of vehicles in accordance with a procedure such as that indicated in the flowchart of FIG. 4.
Figure 6:
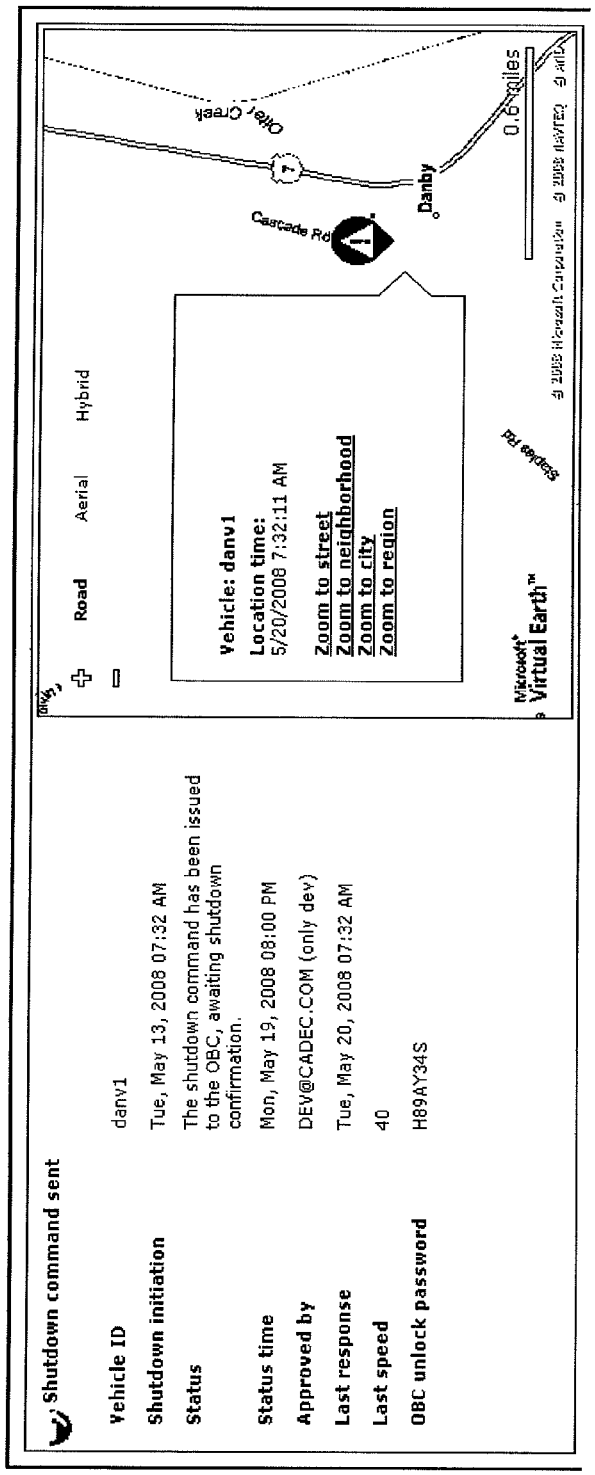
FIG. 6 shows detailed display of one of the records listed in the Web application interface of FIG. 5.

FIG. 5 is an example of a web application interface for managing immobilization of vehicles in accordance with a procedure such as that indicated in the flowchart of FIG. 4. FIG. 6 shows detailed display of one of the records listed in the web application interface of FIG. 5. An administrator or other such person having appropriate authority at a dispatch office might use a web application interface as shown in FIGS. 5 and 6 to initiate and/or monitor engine shutdown and/or vehicle immobilization.

FIG. 5 illustrates a number of records in table form, each record corresponding to a vehicle for which an engine shutdown decision is being awaited, for which engine shutdown is in progress, or for which engine shutdown has been completed or denied. In the table shown in FIG. 5, an Action Required list contains shutdown records that are waiting to be approved or denied. An Active list of the table contains approved shutdown requests that have been sent to the onboard computer 120 but are pending. Although not shown at FIG. 5, a third list entitled Completed In The Last Two Days might be provided, containing shutdown requests that have received a completed response from the onboard computer 120 as well as shutdown requests that have been denied by the administrator.

Clicking on one of the records shown in FIG. 5 might, for example, cause display of mapping information and various other details pertaining to the selected record. The map of FIG. 6 displays the selected vehicle in its last known location. At the map in FIG. 6, hovering a computer mouse over a vehicle might cause display of additional information and zoom options.

In the event that a vehicle is stolen or hijacked, for example, the web application interface shown in FIGS. 5 and 6 might be used to send an engine shutdown command or other such vehicle immobilization command so as to safely immobilize the vehicle. However, this feature would only be effective when the vehicle is in communication range.

For example, an authorized driver might press a panic button 140 or a key fob transmitter 130 as shown in FIG. 3, causing a silent alarm to be sent from the onboard computer 120 to the web application. However, this feature would only be effective when the vehicle is in communication range. At such a time, there would preferably be no visible response on the onboard computer 120 and the onboard computer 120 would preferably continue to function as if nothing had happened.

Upon receipt of the silent alarm, the web application might notify a predetermined list of administrators by email that a silent alarm has been received. The notification email could contain information identifying the vehicle, the serial number of the onboard computer 120, the time that the silent alarm was sent, and a link to a web page having content as shown in FIGS. 5 and 6. Details of the event triggering the email notification could be organized in the form of a record as shown in FIG. 5, and a similar email notification might be sent each time that there is a change in the status or state of the record.

As shown in FIG. 6, clicking the link to the web page allows an administrator to see the current status, last response time, and last known speed of the vehicle. The vehicle can also be displayed on a map.

The web application could automatically generate a record in response to the silent alarm and place the record in an Action Required list as shown in FIG. 5 to await an engine shutdown decision, since it is preferred that engine shutdown be manually authorized by an administrator. Note that an administrator might also have the ability to unilaterally initiate shutdown of any arbitrary vehicle by selecting the vehicle from a pulldown list or otherwise manually generating a record, which might then be placed in the Action Required list shown in FIG. 5.

An administrator might then approve one or more of the records in the Action Required list for shutdown, causing the record to be moved to the Active list and causing an engine shutdown or other such vehicle immobilization signal to be sent from the web application to the onboard computer 120 of the selected vehicle. Upon receipt of the engine shutdown or other such vehicle immobilization command, the onboard computer 120 would carry out engine shutdown and/or vehicle immobilization as described above with reference to FIG. 4 (including any of the various examples and scenarios described).

During processing to carry out engine shutdown and/or vehicle immobilization, the onboard computer 120 would preferably provide no indication that engine shutdown and/or vehicle immobilization is occurring as a result of a deliberate attempt to immobilize the vehicle.

As a precaution to allow for the fact that a shutdown request might fail to reach the onboard computer 120 if the onboard computer 120 is out of range of the dispatch office for too long, possibly resulting in inadvertent shutdown when the onboard computer 120 reenters the range of the dispatch office, it is preferred that shutdown requests expire after, a short period of time (for example, six minutes) if receipt of the shutdown request by the onboard computer 120 is not confirmed within this time.

In this way, a Web application interface, representative portions of one example of which is shown in FIGS. 5 and 6, may be used to manage engine shutdown and/or vehicle immobilization in accordance with one or more embodiments of the present invention. Where such a web application is employed, this may serve the place of the dispatch office mentioned in one or more of the examples described above, the web application permitting automation of one or more aspects of dispatch office functionality and/or permitting dispatch office functionality to be distributed over multiple administrators or other such users at multiple locations. This being the case, it should be understood that embodiments in which dispatch office functionality is mediated by one or more web applications are within the scope of the present invention.

For example, although not shown at FIG. 3, various other standard vehicle circuits may interact with the ECM 110 and/or the onboard computer 120 without departing from the scope of the present invention.

Furthermore, although portions of FIG. 3 may resemble actual circuit diagrams, these schematic representations are intended only as being symbolic of the functional blocks in question and should not be interpreted as limiting application of the present invention to the particular circuitry shown. For example, although connection between various components at FIG. 3 has been described as occurring by way of wiring, this is merely for convenience of description, it being possible in some embodiments to employ any suitable communication line. Moreover, although outputs from the onboard computer 120 at FIG. 3 are shown as separate lines emerging from the onboard computer 120, this is not intended to limit the present invention to any particular circuitry or type of output, it being possible, for example, to employ analog output or an output bus for digital or multiplexed output over a single line or multiple lines from the onboard computer 120.

In addition, although the engine shutdown device of the present invention has been described in terms of an example employing a thermistor or other such temperature sensor having negative temperature coefficient, for which electrical resistance decreases with increasing temperature, it is of course possible to employ a thermistor or other such temperature sensor having positive temperature coefficient, for which electrical resistance increases with increasing temperature, in which case the electrical circuit at the fault-spoofing engine shutdown device 160 and the details of how that circuit operates would be modified appropriately. Moreover, where the fault-spoofing engine shutdown device 160 works by spoofing a high-temperature condition at a temperature sensor, the temperature sensor need not be a thermistor, in which case the appropriate electrical characteristic used for sensing of temperature should be changed during activation of the fault-spoofing engine shutdown device 160 in a direction tending to cause the ECM 110 to think that temperature is too high. Alternatively, the fault-spoofing engine shutdown device 160 in some embodiments might work by making the ECM 110 think that operating temperature is too cold. Moreover, although examples have been given in which the fault-spoofing engine shutdown device 160 spoofs a temperature that is too high or too low, the engine shutdown device of the present invention is not limited to devices that spoof a high or low temperature condition, but may in some embodiments work by spoofing any other fault condition that will result in derating of the engine by the ECM 110.

Furthermore, although the engine shutdown device of the present invention has been described in terms of an example in which a high-temperature fault condition is spoofed by inserting an electrical resistance in parallel with the electrical resistance of an existing temperature sensor, the engine shutdown device of the present invention is not limited to embodiments that work by inserting an additional electrical resistance in parallel with the electrical resistance of an existing fault condition sensor, it being possible in some embodiments for spoofing of a fault condition to occur by insertion of an additional electrical resistance in series with the electrical resistance of the existing fault condition sensor, with appropriate modification being made to circuitry and operation. Moreover, although the engine shutdown device of the present invention has been described in terms of an example in which spoofing occurs by affecting electrical resistance, in some embodiments the fault-spoofing engine shutdown device 160 may spoof a fault condition by changing capacitance, inductance, or any other electrical characteristic capable of being sensed by the ECM 110 and preferably used by the ECM 110 as basis for engine derate or other such engine shutdown procedure, with appropriate modification being made to the circuit and operation.

Furthermore, although the present invention has been described in terms of examples in which engine shutdown and/or vehicle immobilization may be triggered in a number of ways, FIG. 3 showing, for example, a key fob transmitter 130, a key fob receiver 135, a panic button 140, and an onboard computer transceiver 125 for two-way communication with a dispatch office, all such components involved with triggering of engine shutdown and/or vehicle immobilization need not be present, it being sufficient in some embodiments that there is at least one component present for triggering of engine shutdown and/or vehicle immobilization.

Moreover, although the present invention has been described in terms of examples in which not only a fault-spoofing engine shutdown device 160 but other vehicle immobilization devices including an accelerator disable device 170, a starter disable device 180, and an ECM override disable device 190 are present, in some embodiments one or more of these additional vehicle immobilization devices may be absent. It is possible in some embodiments that the only vehicle immobilization device present is the fault-spoofing engine shutdown device 160.

It is also possible in some embodiments that a delay is incorporated following triggering of engine shutdown and/or vehicle immobilization, before engine shutdown and/or vehicle immobilization is implemented, so as to increase the chance that the authorized driver will not be nearby when engine shutdown and/or vehicle immobilization occurs.

Although the transceiver 125 that allows the onboard computer 120 to be in two-way communication with a dispatch office is shown in FIG. 3 as being separate from the onboard computer 120, the functionality of the transceiver 125 may of course be integrated into the onboard computer 120. Moreover, transmit and receive functionalities need not be provided in the form of a single transceiver but may be provided separately in the form of a transmitter and a receiver.

Furthermore, although the present invention has been described in terms of examples in which a dispatch office (including situations where, in some embodiments, dispatch office functionality is mediated by a web application interface) is involved in engine shutdown and/or vehicle immobilization, this need not be the case. Instead, it is possible in some embodiments for engine shutdown and/or vehicle immobilization to proceed locally or autonomously without the need for interaction with a dispatch office. That is, although some embodiments of the present invention are described in terms of examples in which the engine shutdown or other such vehicle immobilization command originates from a dispatch office, this is not necessarily the case. For example, in one of the examples described above it was explained how engine shutdown and/or vehicle immobilization may occur when the vehicle is out of radio communication with its dispatch office. Although it is preferred for reasons of vehicle management and control to, wherever possible, have the command for engine shutdown and/or vehicle immobilization originate from or at least be validated by a dispatch office or similar authority, where appropriate the onboard computer 120 can be programmed to allow engine shutdown and/or vehicle immobilization to be carried out automatically and/or directly without intervention or mediation by a dispatch office or other such authority other than the authorized driver even when the onboard computer 120 is still in radio communication with the dispatch office, in response to, for example, pushing of the panic button 140, pressing of the key fob transmitter 130, or occurrence of any other event capable of being sensed by the onboard computer 120, either directly or by way of input from the ECM 110 or other such vehicle circuitry. Thus, where a dispatch office (or web application interface) is not involved in engine shutdown and/or vehicle immobilization, the onboard computer 120 might, for example, automatically carry out one or more of the functions described above as being carried out by a dispatch office (or web application).

Furthermore, in some embodiments of the present invention, the onboard computer 120 might also be omitted, engine shutdown and/or vehicle immobilization being carried out in switched or automated fashion in response to, for example, pressing of a key fob transmitter 130 or a panic button 140, without involvement by an onboard computer 120 and/or a dispatch office. That is, in some embodiments, engine shutdown and/or vehicle immobilization can be carried out by the onboard computer 120 in response to commands from a dispatch office (or web application) or locally. For example, where a dispatch office is employed but the onboard computer 120 is out of range of the dispatch office, or an unauthorized driver has deliberately damaged the antenna of the onboard computer transceiver 125 so as to prevent communication between the onboard computer 120 and the dispatch office, it may be desirable for engine shutdown and/or vehicle immobilization to proceed locally and/or autonomously. Other situations in which engine shutdown and/or vehicle immobilization might proceed locally and/or autonomously include scenarios in which the authorized driver has a key fob and is in the vicinity of the vehicle, and situations in which the position of the vehicle is in violation of its operational restrictions (for example, entry into or exit from a prescribed geographic area as determined by GPS or other position sensing system).

However, where an onboard computer is present, this will allow engine shutdown and/or vehicle immobilization to be carried out under programmatic control from the onboard computer. This is useful for vehicles carrying passengers or hazardous material that might have been hijacked or pose a threat in some other way.

As described above, the present invention provides an engine shutdown device and a system and method for immobilizing a vehicle. The system and method of the present invention makes it possible for unauthorized use of a vehicle to be thwarted or discouraged without jeopardizing the safety of the driver. Because some embodiments of the present invention cause an onboard computer to spoof a high-engine-temperature or other such fault condition in response to a command from a dispatch office, causing the electronic control module (ECM) of the vehicle to implement the standard engine derate procedure of the vehicle, for example, for progressive shutdown of the engine of the vehicle, damage to the vehicle and/or voiding of vehicle warranties may be avoided. Moreover, because in some embodiments engine shutdown is carried out by tricking the ECM, indications at vehicle gauges and progression of the engine derate sequence are essentially the same as if a genuine fault condition had occurred, thereby permitting vehicle immobilization to be carried out in a manner credibly attributable to a genuine vehicle fault condition so as to allow the authorized driver to plausibly deny that the authorized driver initiated vehicle immobilization or that the authorized driver has the ability to return the vehicle to normal control. Moreover, because engine shutdown as carried out by the ECM through utilization of the standard engine derate procedure as programmed by the automobile manufacturer typically occurs in gradual, stepwise, or progressive fashion, the authorized driver may be afforded a chance to get away or otherwise not be present by the time that the vehicle is completely immobilized.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for immobilizing a vehicle having an electronic control module that monitors one or more characteristics at one or more sensors, the system comprising:
    a fault-spoofing engine shutdown device;
    a memory; and
    a processor configured by the memory to perform the steps of:
        receiving an engine shutdown command; and
        in response to receiving the engine shutdown command, causing the fault-spoofing engine shutdown device to alter a first characteristic of the one or more characteristics detected by a first sensor of the one or more sensors in such manner as to mimic a fault condition causing the electronic control module (ECM) in communication with the first sensor to carry out an engine derate procedure in the same fashion as if a genuine fault condition had been detected by the first sensor that will appear to an unauthorized driver of the vehicle to be credibly attributable to the mimicked fault,
    wherein the first sensor is configured to detect the first characteristic, and the fault-spoofing engine device alters the first characteristic such that the first sensor detects the altered first characteristic and the first sensor detection of the altered first characteristic is monitored by the electronic control module.

2. A vehicle immobilization system according to claim 1 wherein the first sensor is a temperature sensor and the first characteristic is electrical resistance.

3. A vehicle immobilization system according to claim 2 wherein the first sensor is a thermistor having a negative temperature coefficient.

4. A vehicle immobilization system according to claim 1 wherein the processor is further configured by the memory to perform the step of:

constraining operation of one or more other vehicle systems in such manner as to increase the likelihood that the vehicle can be safely immobilized.

5. A vehicle immobilization system according to claim 4 wherein the constraining of operation of one or more other vehicle systems includes disabling a throttle position sensor circuit so as to prevent a preset engine idle speed from being exceeded.

6. A vehicle immobilization system according to claim 4 wherein the constraining of operation of one or more other vehicle systems includes disabling a starter circuit so as to prevent the vehicle from being restarted.

7. A vehicle immobilization system according to claim 4 wherein the constraining of operation of one or more other vehicle systems includes disabling an ECM override circuit.

8. A vehicle immobilization system according to claim 1 wherein the engine shutdown command is received from a location that is local relative to the vehicle.

9. A vehicle immobilization system according to claim 8 wherein the engine shutdown command is triggered by one or more species selected from among the group consisting of: activation of a panic button; activation of a key fob transmitter; entry into a prescribed geographic area; and exit from a prescribed geographic area.

10. A vehicle immobilization system according to claim 1 wherein the system further comprises a transceiver;
the processor is further configured by the memory to perform the step of sending an alert indicating unauthorized use of the vehicle to a location that is remote relative to the vehicle; and
the engine shutdown command is received from the remote location.

11. A vehicle immobilization system according to claim 10 wherein the engine shutdown command is triggered by one or more species selected from among the group consisting of: activation of a panic button; activation of a key fob transmitter; loss of communication between the vehicle and the remote location; entry into a prescribed geographic area; and exit from a prescribed geographic area.

12. A vehicle immobilization system according to claim 1 wherein the altering of the first characteristic by the fault-spoofing engine shutdown device occurs after the receiving of the engine shutdown command, and the processor is further configured by the memory to perform the step of:
inserting a delay between the receiving of the engine shutdown command and the altering of the first characteristic so as to afford an authorized driver a chance to get away or otherwise not be present when the engine derate procedure is carried out.

13. A computer-readable medium having stored thereon computer-executable instructions for configuring a processor to perform the steps of:
receiving an engine shutdown command; and
in response to receiving the engine shutdown command, causing a fault-spoofing engine shutdown device to alter a characteristic detected by a sensor in such manner as to mimic a fault condition causing an electronic control module (ECM) of a vehicle in communication with the sensor to carry out an engine derate procedure in the same fashion as if a genuine fault condition had been detected by the sensor that will appear to an unauthorized driver of the vehicle to be credibly attributable to the mimicked fault,
wherein the sensor is configured to detect the characteristic, and the fault-spoofing engine device alters characteristic such that the sensor detects the altered characteristic and the sensor detection of the altered characteristic is monitored by the electronic control module.

14. A computer-readable medium according to claim 13 having further stored thereon computer-executable instructions for configuring a processor to perform the step of constraining operation of one or more other vehicle systems in such manner as to increase the likelihood that the vehicle can be safely immobilized, wherein the constraining of operation of one or more other vehicle systems is one or more species selected from among the group consisting of: disabling a throttle position sensor circuit so as to prevent a preset engine idle speed from being exceeded; disabling a starter circuit so as to prevent the vehicle from being restarted; and disabling an ECM override circuit.

15. The system of claim 1, wherein the fault condition is mimicked by energizing a relay.

16. The system of claim 15, Wherein energizing the relay inserts an electrical resistance in a circuit to change a resistance detected by an electronic control module.

* * * * *